United States Patent [19]

Huelle et al.

[11] 4,364,238

[45] Dec. 21, 1982

[54] VALVE FOR REFRIGERATION PLANT

[75] Inventors: Zbigniew R. Huelle, Sonderborg; Leif Nielsen, Nordborg; Jakob S. Jakobsen, Sonderborg, all of Denmark

[73] Assignee: Danfoss A/S, Nordborg, Denmark

[21] Appl. No.: 183,270

[22] Filed: Sep. 2, 1980

Related U.S. Application Data

[63] Continuation of Ser. No. 956,572, Nov. 1, 1978, abandoned.

[30] Foreign Application Priority Data

Nov. 3, 1977 [DE] Fed. Rep. of Germany ....... 2749249

[51] Int. Cl.³ .......................................... F25B 41/04
[52] U.S. Cl. ........................................ 62/217; 62/229
[58] Field of Search ............... 236/68 R; 62/217, 229; 251/11

[56] References Cited

U.S. PATENT DOCUMENTS 2,943,643  7/1960  Pinter et al. ........................ 236/68 R
3,168,805  2/1965  Fleury ................................ 251/11 X
3,500,634  3/1970  Waselski, Jr. et al. ............ 251/11 X Primary Examiner—William E. Wayner
Attorney, Agent, or Firm—Wayne B. Easton

[57] ABSTRACT

The invention relates to a valve unit for a refrigeration plant of the kind used for controlling the flow of refrigerant from the evaporator to the compressor. The closure member for the valve unit is controlled directly or indirectly by a movable wall of an expansible chamber filled with a refrigerant medium having vapor and liquid phases. The pressure exerted by the vapor phase of the medium provides a bias in a valve closing direction which is directly related to the temperature of the liquid phase. A heat transfer element such as a heating resistor in the liquid phase is heated or allowed to cool in a controlled manner by an external control unit. A temperature responsive sensor element in the liquid phase of the medium is part of a feedback system for the control unit which allows a selected temperature to be maintained in the chamber which results in a desired constant pressure in a valve closing direction to be maintained in the chamber.

1 Claim, 7 Drawing Figures

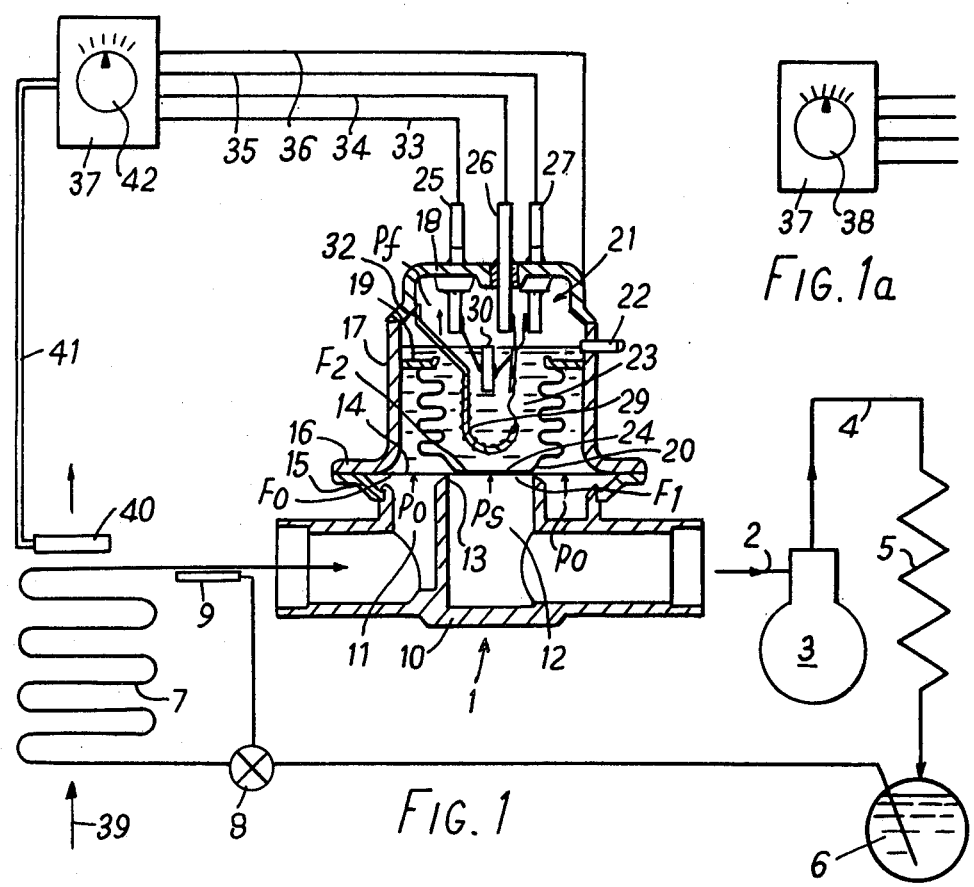
Fig. 1
Fig. 1a
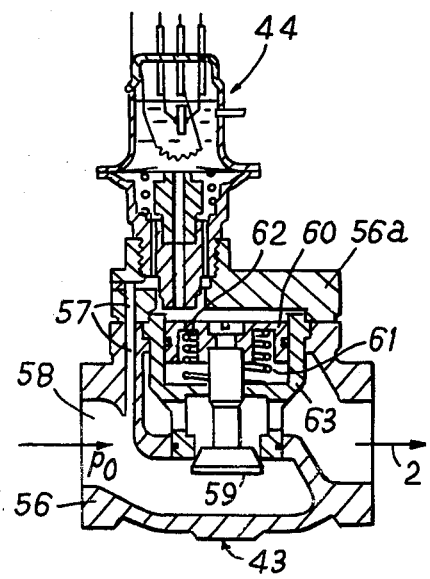
Fig. 2

VALVE FOR REFRIGERATION PLANT

This application is a continuation of Ser. No. 956,572 filed 11/1/78, now abandoned.

The invention relates to a valve for refrigeration plant, of which the closure member assumes a condition of equilibrium depending on the vapour pressure of the refrigerant, particularly the evaporator pressure, acting on a first displaceable pressure face, and an oppositely acting reference force.

In known valves of this kind, an adjustable spring serves as the reference force. Such valves can be used to keep the evaporator pressure in a refrigeration plant constant. A change in the desired evaporator pressure is, however, difficult; it requires adjustment of the spring in situ. In addition, the evaporator pressure cannot accurately be kept at the desired value because, with a larger throughput of refrigerant, the valve must open further and will thereby set a higher reference force.

Further, thermohydraulic valves for heating installations or the like are known, wherein a pressure cylinder filled with an expansion medium is closed at one end by a fixed cover and at the other by a piston connected to the valve shank. The expansion medium accommodates a heating and/or cooling element which is supplied with energy by a control device in response to a room thermostat. In this way the temperature and thus the volume of this expansion medium is influenced. This temperature is reported back to the control device by means of a temperature sensor. The valve is set back by means of a spring.

The invention is based on the problem of providing a valve of the aforementioned kind for refrigeration plant permitting a simple and also remote control change to be brought about in the setting of the desired refrigerant vapor pressure and/or permitting the set value to be held constant over the entire range of adjustment.

This problem is solved according to the invention in that for the purpose of producing the reference force there is a closed pressure vessel which comprises a wall section forming a second displaceable pressure face and which is filled with a medium having a vapour phase exerting a temperature responsive pressure, that the medium is associated with heating means fed with current from a control unit and a temperature sensor which resports the temperature of the medium back to the control unit, and that the medium is selected so that its temperature at a pressure bringing about equilibrium is higher than the temperature of the refrigerant in the valve and/or of the surrounding air.

With the aid of the heating means, a vapour pressure is produced in the pressure vessel that is a direct function of the temperature produced by heating. This temperature can be held at a predetermined value by means of the feedback by the temperature sensor, so that a constant pressure reference value is obtained. This results in a well-defined reference force which can, however, be changed by the control unit. The valve therefore assumes a position of equilibrium that depends on the one hand on the reference force and on the other hand on the force exerted on the first pressure face by the refrigerant vapour pressure. Since the vapour pressure of the medium in the pressure vessel is substantially only dependent on temperature, this relationship applies over the entire setting range. Since the pressure vessel continuously dissipates heat to the refrigerant or the surrounding air, one can rapidly achieve not only a higher reference pressure by more intensive heating but also a lower reference pressure by permitting cooling off.

Desirably, the temperature of the medium in the operating range is 25° to 45° C., preferably 30° to 40° C., higher than the refrigerant temperature. In particular, it should also be somewhat higher than ambient temperature. This results in a high speed of response. Nevertheless, the amount of heat supplied is no larger than is absolutely necessary. The speed of response can be increased still further in that the pressure vessel is connected to the valve housing by a metallic heat-conductive bridge. Further, the pressure vessel may be provided with cooling ribs on the outside.

In a preferred embodiment, the vapour pressure/temperature curve of the medium is at higher levels of temperature in the operating range than is that of the refrigerant. In this way the first and second pressure faces can be equal in size but the required temperature difference between the medium and refrigerant can nevertheless be maintained.

If, on the other hand, the same refrigerant is to be used in the refrigeration plant and in the pressure vessel, it is advisable for the second pressure face to be smaller than the first pressure face. One can also use an additional spring which acts in the direction of the vapour pressure of the refrigerant.

The heating means may be formed by a helix of resistor wire. This wire has a comparatively large surface area for heat dissipation. Alternatively, or in addition, use may be made of a PTC resistor element. This has the advantage that the current is automatically limited if there is an excessively high power supply. Further, use can also be made of a power transistor which heats the medium through loss-heating. Other possibilities consist of surrounding the pressure vessel with a high frequency coil and heating the medium inductively. In the case of an electrically conductive medium, the heating means may also be two electrodes having a variable A.C. current applied to them.

Similarly, instead of the heating means there may also be cooling means, e.g. a Peltier element of which the cold soldered point is disposed in the pressure vessel. Provision must in that case be made for the temperature of the medium in the pressure vessel to be lower than the temperature of the refrigerant or the ambient air. In this connection it is also recommended to have a heat-conductive bridge to the valve and/or external ribs on the pressure vessel.

In a preferred embodiment, the medium has a liquid and a vapour phase. The temperature at the surface of the liquid is then that temperature which is responsible for the vapour pressure, irrespective of the size of the vapour chamber.

In this case it is advisable for the heating or cooling means and the feedback temperature sensor to be disposed entirely within the liquid phase because this facilitates a better heat transfer.

Further, the pressure vessel can be considerably more than half-filled with the liquid, particularly by about 70%. In this way it is possible to arrange the valve in any desired position, the heating or cooling means and the temperature sensor always being within the liquid phase if they are arranged in about the middle. By way of example, a pressure vessel having a volume of about 20 to 25 cm$^3$ is favourable. In particular, it may be substantially spherical.

The medium may also have a solid adsorbent and a gaseous absorbate. With such an adsorption filling, the gas is driven out of the adsorbent as a function of the temperature. Here the vapour pressure is also dependent substantially only on the temperature.

As a feedback temperature sensor an NTC resistor or a thermo-element is recommended. This produces a feedback coupling for the control unit so that disturbing influences from the refrigerant or the ambient air can be rapidly taken into account.

It is particularly advantageous if the feedback temperature sensor is formed by the base-emitter path of the power transistor because in that case the heating means and the temperature sensor can be combined as a single element. This results in simpler assembly, even more accurate temperature measurement and also a safety measure against the supply of excessive power.

In one embodiment, the pressure vessel comprises a multi-polar duct, the temperature sensor being connected to the first pole and the second pole and the heating resistor being connected to the third pole and the fourth pole or to the body of the pressure vessel. In particular, the multi-polar duct can comprise plug-in pins which, insulated by an insulating material such as glass, pass through a dished cover of the pressure vessel. This results in simpler assembly because all components can be secured to these plug pins and the cover can then be welded to the wall of the pressure vessel.

By reason of its simplicity, a construction is preferred in which the first and second pressure faces are formed by the two sides of a plate such as a diaphragm or the base of bellows.

Further simplification is obtained if the plate co-operates with the valve seat. It therefore not only serves to separate the two pressure media as a carrier of the two pressure faces but also as the closure member of the valve.

In this case there may be a supporting face which is disposed beyond the valve seat and against which the plate lies when the pressure in the pressure vessel is excessive. This safety measure is advisable particularly in cases where the valve seat is merely formed by a small nozzle. On the other side, i.e. in the pressure vessel, there may be a dished annular disc against which the plate abuts when the vapour pressure of the refrigerant is excessive. In this way the plate is relieved if no pressure equilibrium is obtained.

For the purpose of changing the refrigerant vapour pressure, the control unit is preferably connected to an adjustable resistor for changing the pressure in the pressure vessel.

However, one can also make the regulation dependent on a further physical quantity. In particular, the control unit may be connected to at least one outer temperature sensor on the detached value of which the pressure in the pressure vessel depends. When this outer temperature sensor is disposed in the medium cooled by the refrigerant, for example in the air cooled by the evaporator, the air temperature can be kept constant in this manner.

For the purpose of the last-mentioned application, a control unit is suitable which comprises the following components:

(a) a first bridge circuit with an outer temperature-sensing resistor and a desired value potentiometer, as well as a first amplifier which is energised by the diagonal voltage thereof and has adjustment possibilities for a P, PI or PID behaviour, (b) a second bridge circuit with a feedback temperature sensing resistor and an adjusting potentiometer, as well as a second amplifier energised by the diagonal voltage thereof, (c) a summating circuit which has two adjustable resistors and in which the output signals of the first and second amplifier are added, and (d) a third amplifier energized thereby and having a downstream current regulator in series with the heating or cooling means.

The stated possibilities of adjustment permit adaptation to practically all the regulating problems encountered in this connection.

In the first place, the valve serves to regulate the evaporator pressure. For this purpose it may regulate the passage through the suction conduit. However, it may also regulate the flow through a transmission conduit connecting the pressure and suction conduits and feed hot gas into the evaporator. For example, the hot gas can be fed to a liquid/gas mixer disposed between the thermostatic expansion valve and a liquid distributor upstream of the evaporator.

In both cases, it can also serve as a pilot valve for a main valve. In this case it may be mounted on the cover of the main valve, pilot passages being provided in the housing and cover of the main valve.

In these types of regulation, the pressure in the pressure vessel may be set to a fixed value. In this way one obtains a constant evaporator pressure.

However, one can also ensure that the outer temperature sensor is influenced by the cooled medium and the pressure in the pressure vessel can be set to a value such that the temperature of the cooled medium remains constant. In this way one keeps the temperature of the cooled medium constant.

The invention will now be described in more detail with reference to examples illustrated in the drawing, wherein:

FIG. 1 shows the arrangement of a valve according to the invention installed in a refrigeration plant as an evaporator pressure regulator;

FIG. 1a shows a different type of control unit;

FIG. 2 shows the arrangement of a valve according to the invention as a pilot valve for a main valve which keeps the temperature of the cooled medium constant by regulating the evaporator pressure;

Figure 3:
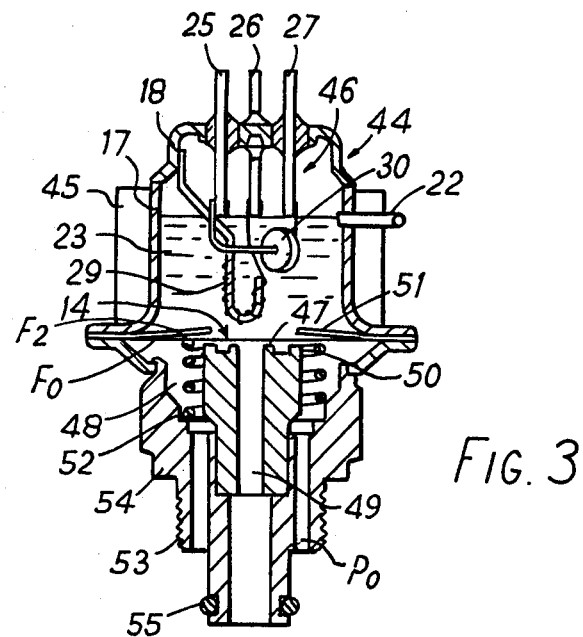
FIG. 3 is an enlarged representation of the FIG. 2 pilot valve.

FIG. 1 illustrates a valve 1 which may be arranged in the suction conduit 2 of a refrigeration plant. The refrigeration plant comprises a compressor 3 with a pressure conduit 4, a condenser 5, a collector 6 and an evaporator 7. An expansion valve 8 is controlled by a sensor 9 in response to the suction gas temperature.

The valve 1 comprises a housing 10 with an annular inlet passage 11 and a central outlet passage 12 separated from each other by a valve seat 13. A diaphragm 14 which also seves as a closure member is secured between a flange 15 of the housing 10 and a flange 16 of a capsule 17 which is closed at the top by a dished cover 18. The capsule 17, cover 18, an annular disc 19 and bellows 20 form a pressure vessel 21. The latter is filled by way of a filling tube 22 with a two-phase medium 23 which is present in the liquid phase in the lower portion and in the vapour phase in the upper portion. The base 24 of the bellows 20 has the cross-sectional size of the valve seat 4 and rests on the diaphragm 14. Three pins 25, 26 and 27 pass through the cover 18. Glass insulation 28 also serves as a seal. In the liquid phase, there is a heating resistor 29 in the form of a helix of resistance wire and an NTC temperature sensor 30. These parts are held by means of supporting wires 31. The heating resistor 29 is connected to the pin 26 and the body 32 of the pressure vessel 21, and the temperature sensor 30 is connected to the pins 25 and 27. The said pins and body are connected to a control unit 37 by four conductors 33, 34, 35 and 36. In the FIG. 1a embodiment, a knob 38 actuating an adjustable resistor can be used to produce in the pressure vessel 21 a particular vapour pressure $P_f$ which acts on the second pressure face $F_2$. In the opposite direction, the evaporator pressure $P_o$ acts on the first pressure face $F_o$ and, with a considerably lower action, the suction pressure $p_s$ acts on a pressure face $F_1$. This produces a condition of equilibrium.

The medium 23 is selected so that in the condition of equilibrium it has a higher temperature than the refrigerant and ambient temperature. If the evaporator pressure is to be increased, the temperature of the medium 23 is raised by more intensive heating. If, on the other hand, the evaporator pressure is to be reduced, the medium 23 can assume a lower temperature by dissipating heat to the refrigerant and the surrounding air. The vapour pressure will then always remain the same, irrespective of how far the valve has to open to maintain the desired evaporator pressure.

Figure 6:
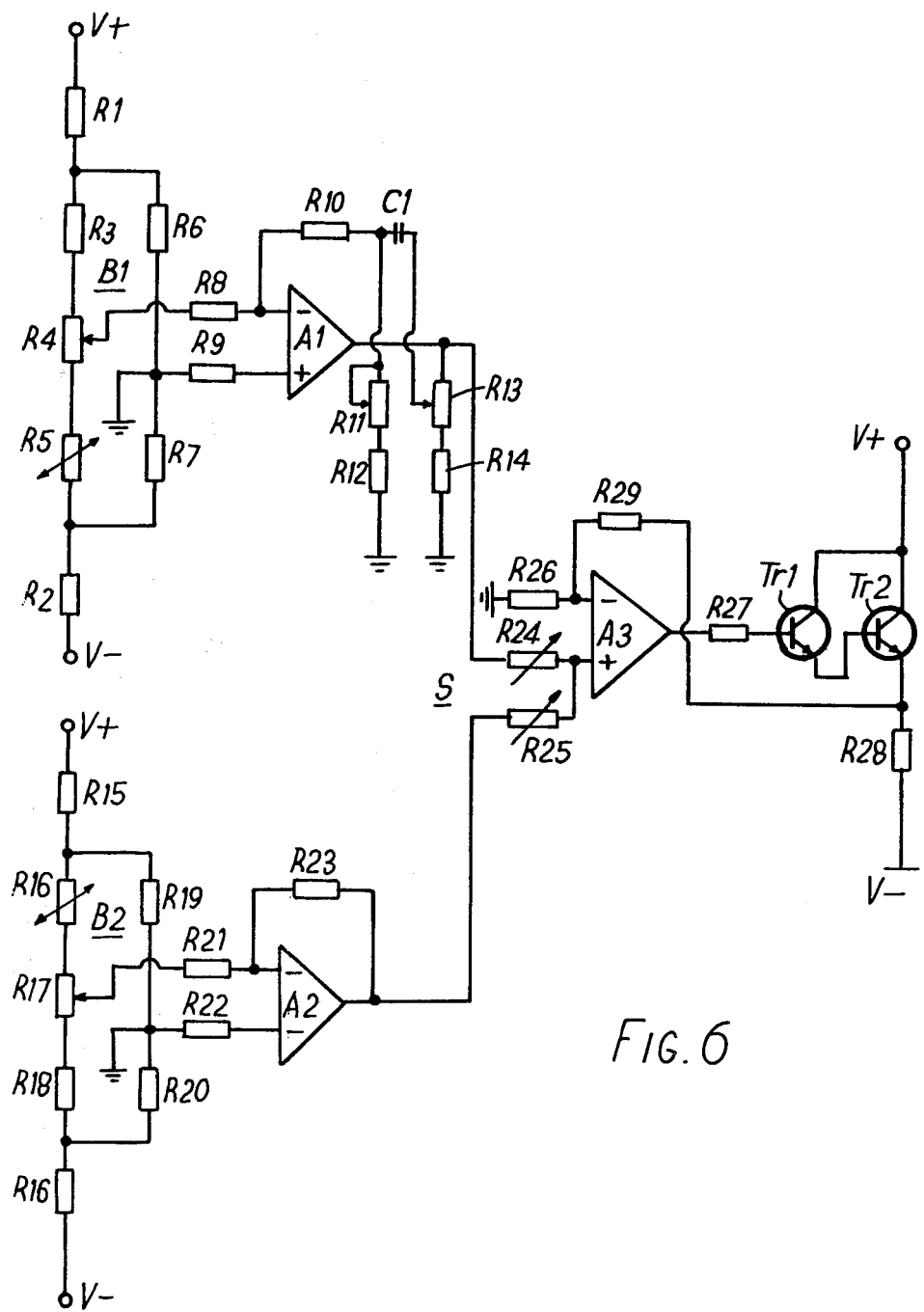

In the FIG. 1 embodiment, an outer temperature sensor 40 which gives a temperature signal to the conrol unit 37 by way of signal lines 41 is disposed in the flow 39 of the cooled medium from the evaporator 7. The control unit here comprises a setting knob 42 with the aid of which one can set the desired value for the temperature of the cooled medium. A corresponding circuit for the control unit is shown in FIG. 6. In this manner of operation, the pressure $P_f$ in the pressure vessel 21 is regulated such that the temperature of the cooled medium retains the set desired value. This occurs with the aid of three regulating loops connected behind one another in cascade. A control departure detected by the sensor 40 causes a change in heating and thus a change in the vapour pressure $P_f$. The vapour pressure preselected in this way is kept constant because undesirable changes are immediately compensated as a result of feedback through the temperature sensor 30. If the evaporator pressure alters, the original condition is restored extremely rapidly by displacement of the diaphragm 14.

FIG. 2 shows a main valve 43 again disposed in the suction conduit 2 and controlled by a pilot valve 44 which is constructed according to the invention and more accurately shown in FIG. 3. Corresponding parts have the same reference numerals as in FIG. 1.

A first difference is that the capsule 17 is provided with cooling ribs 45 on the outside and the pressure vessel 46 is bounded by the cover 18, capsule 17 and diaphragm 14 which therefore carries the first pressure face $F_o$ as the second pressure face $F_2$. A nozzle-like valve seat 47 separates an annular inlet chamber 48 from a central outlet passage 49. At a spacing outside the valve seat there are supporting faces 50 which consist of annular rib sections and relieve the diaphragm 14 when the evaporator pressure drops excessively. On the opposite side there is a dished annular disc 51 which relieves the diaphragm if the evaporator pressure should become too high. In addition, the diaphragm is loaded by a weak spring 52 acting in the direction of the evaporator pressure. By means of a screwthread 53 on the housing 54, the pilot valve 44 can be screw-connected direct to the cover 56a of the main valve 43, the outlet passage 49 being sealed by an annular seal 55. With the aid of pilot passages 57 disposed in the cover 56a and housing 56 of the main valve, the inlet section 58 of the main valve 53 communicates with the annular chamber 48 of the pilot valve. The main valve has the usual construction. The closure member 59 is connected to a piston 60 which is loaded by a spring 61. With the aid of two throttles 62 and 63, a pressure drop is produced which depends on the open position of the pilot valve 44 and proportionally opens the main valve.

Regulation of this valve takes place in a manner similar to that of the FIG. 1 embodiment.

Figure 4:
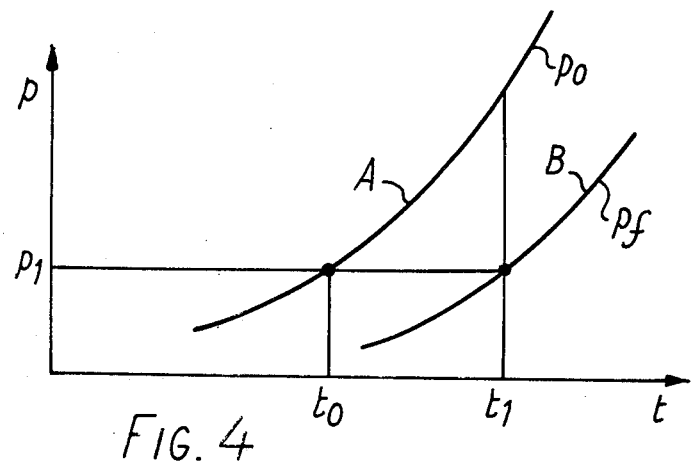
FIG. 4 is a vapour pressure/temperature diagram for the refrigerant and the medium in the pressure vessel.

FIG. 4 shows a diagram in which the vapour pressure p is shown against temperature t. The curve A corresponds to the refrigerant in the refrigeration plant, i.e. it shows the valve opening evaporator pressure $P_o$ against the evaporator temperature. The curve B shows the characteristic for the medium in the pressure vessel, i.e. the valve closing vapour pressure $p_f$ against the medium temperature. The evaporator temperature $t_o$ normally lies considerably under the ambient temperature. If the areas of the two pressure faces $F_o$ and $F_2$ in FIG. 1, for example, are equal, equillibrium is achieved if $t_1$ is adjusted so that pressures $P_f$ and $P_o$ are equal. Consequently, by reducing the heating power to effect corresponding cooling of the medium in the pressure vessel, the pressure $P_f$ can be lowered to alter the equilibrium and thereby effect lowering of the evaporator pressure $P_o$ until equilibrium is restored. The pressures $P_o$ and $P_1$ can be likewise increased by increasing the heating power.

With the aid of the spring 52 one ensures that the operating range of the valve with the same two-phase medium is displaced towards a higher temperature so that it can be used at a lower temperature of the refrigerant.

Figure 5:
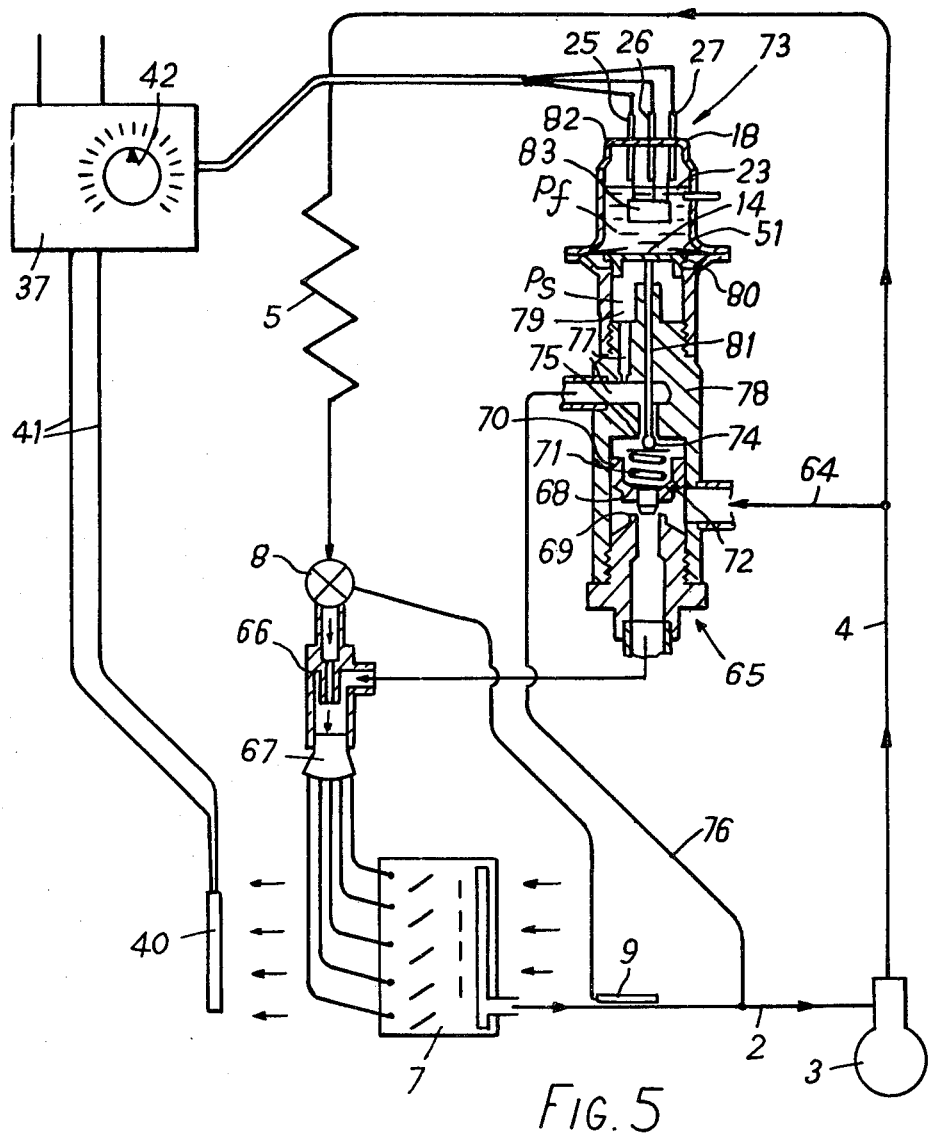
FIG. 5 shows the arrangement of a valve according to the invention as a capacity regulator for injecting hot gas and FIG. 6 is a circuit diagram of one embodiment of the control unit.

FIG. 5 shows a capacity regulator operating with hot gas injection. Again, comparable parts are provided with the same reference numerals as in FIG. 1. This hot gas is derived from the pressure conduit 4, fed by way of a transmission line 64 with a main valve 65 and injected into a liquid/gas mixer 66 disposed between the expansion valve 8 and a liquid distributor 67. The closure member 68 which co-operates with a seat 69 is provided on a piston 70 which is subjected to a spring 71 and the pressure drop at a throttle orifice 72. This pressure drop is controlled by a pilot valve 73 of which the closure member 74 co-operates with a seat 75. The downstream side of this valve communicates with the suction conduit 2 by way of a pilot passage 76. Pilot passages 77 in the housing 78 of the pilot valve lead to a pressure chamber 79 which is covered by the diaphragm 14. The diaphragm acts on the closure member 74, a pressure shoe 80 and valve shank 81 being interposed. In the pressure vessel 82, which is bounded by the capsule 17, the cover 18 and the diaphragm 14, the liquid phase of the medium 23 contains a power transistor 83 of which the emitter is connected to the pin 25, the base to the pin 26 and the collector to the pin 27.

Consequently, three lines lead to the control unit 37. The base-emitter path of the power transistor 83 here serves as a temperature sensor.

The pressure $P_f$ in the pressure vessel 82 is controlled as a function of the control departure between the temperature of the outer sensor 40 and the set desired value of temperature. Upon a change in the heat loading, the suction pressure $P_s$, which also acts beneath the diaphragm 14, is changed. If the suction pressure drops, the diaphragm is pushed downwardly, whereby the closure member 74 is lifted further off the seat 75. Consequently a larger amount of refrigerant flows through the throttle 72 and the main valve opens further. The hot gas that is now fed to the expanded refrigerant liquid in the mixer 66 causes more intensive super-heating which is detected by the sensor 9 of the thermostatic expansion valve 8 and leads to increased liquid injection from the valve 8. By the supply of hot gas, the temperature of the cooled air can thus be kept substantially constant. In addition, one prevents the suction pressure $P_s$ of the compressor 3 from dropping to impermissibly low values. An example of the circuitry for the FIG. 1 control unit is shown in FIG. 6. A first bridge B1 is applied between the terminals V+ and V− for the positive and negative voltage by using upstream resistors R1 and R2. In its one branch, the bridge comprises a fixed resistor R3, a potentiometer R4 adjustable by means of the knob 42, and a temperature-responsive resistor R5 which is disposed in the sensor 40. The other branch consists of two fixed resistors R6 and R7 which fix the earthed reference point of the bridge B1. The two diagonal voltages are applied by way of a respective resistor R8 and R9 to the two inputs of a first amplifier A1. The inverting input is connected to the earthed reference point by way of a resistor R10, an adjustable resistor R11 and a fixed resistor R12; these resistors therefore form a voltage divider energised by the input voltage. At the tapping between the resistors R10 and R11 there is connected an electrode of a condenser C1 of which the other electrode is disposed at the tapping of a potentiometer R13. Together with a fixed resistor R14, the potentiometer R13 forms a voltage divider energised by the output voltage.

A second bridge B2 is applied between the voltage sources V+ and V− by using upstream resistors R15 and R16. In the one branch it comprises a temperature responsive resistor R16 which corresponds to the sensing resistor 30, a potentiometer R17 by which adjustment is possible, and a fixed resistor R18. The other branch consists of two resistors R19 and R20 between which there is an earthed reference point. The diagonal points are connected by way of the resistors R21 and R22 to the inputs of a second amplifier A2 which is provided with a feedback resistor R23.

A summating circuit S comprises two adjustable resistors R24 and R25 by which the output signals of the two amplifiers A1 and A2 are fed to a third amplifier A3 of which the other input is applied to the earthed reference point by way of a resistor R26. The output of this amplifier is connected by way of a resistor R27 to a transistor amplifier consisting of two transistors Tr1 and Tr2 connected in a Darlington circuit. A heating resistor R28 corresponding to the resistor 29 is connected in series with the collector-emitter path of the transistor Tr2. The emitter potential is returned to the inverting input of the amplifier A3 by way of a resistor R29.

This circuit permits proportional power amplification of the voltages from the two operational amplifiers A1 and A2 that are added at the non-inverting input of the amplifier A3. The adjustable resistors R24 and R25 permit the influences of the two bridges B1 and B2 to be taken into account with a different emphasis. With the aid of the resistors R11 and R13, one can set the proportionality factor and the integration constant at the amplifier A1. On the whole, this permits one to achieve regulation in which the integration condenser C1 need not assume very high values. If the resistor R24 is set to infinity, regulation depends solely on the bridge B2. If the rotary knob 38 of the control unit 37 is now associated with the adjustable potentiometer R17, this knob permits one to set the desired temperature and thus the vapour pressure $P_s$ to a desired value.

Only slight modifications are necessary if a thermoelement is used as the temperature sensor 30 or if the heating resistor 29 is replaced by a power transistor. Again, only slight alterations are required to be made to the entire circuit if cooling means are used instead of heating means.

We claim:
1. A refrigeration system comprising, a compressor and an evaporator, a valve unit having an inlet and an outlet with an opening therebetween, said valve unit inlet being connected to the output side of said evaporator and said valve unit outlet being connected to the suction side of said compressor, chamber means for said valve unit, valving means comprising a movable wall for said chamber and closure means for said opening, a filling medium for said chamber having a vapor phase exerting a temperature responsive reference pressure $P_f$ biasing said wall of said valving means in a valve closing direction, passage means for allowing the vapor pressure $P_o$ or refrigerant in said inlet to bias said wall in a valve opening direction to provide a valve opening for said closure means corresponding to the difference between said $P_o$ and $P_f$ pressures, control means for controlling the temperature of said filling medium including heat transfer means and first feedback temperature sensing means in said chamber, said control means further including second feedback temperature sensing means in the air flow stream of said evaporator on the downstream side thereof, said filling medium having characteristics so that its temperature which brings about equilibrium between said biasing of said closure means in opening and closing directions is greater than either said refrigerant in said inlet or the surrounding air or both.

* * * * *